(12) United States Patent
Wang

(10) Patent No.: US 9,392,272 B1
(45) Date of Patent: Jul. 12, 2016

(54) VIDEO CODING USING ADAPTIVE SOURCE VARIANCE BASED PARTITIONING

(71) Applicant: Google Inc., Mountain View, CA (US)

(72) Inventor: Yunqing Wang, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 239 days.

(21) Appl. No.: 14/293,304

(22) Filed: Jun. 2, 2014

(51) Int. Cl.
| | |
|---|---|
| H04N 7/12 | (2006.01) |
| H04N 11/02 | (2006.01) |
| H04N 11/04 | (2006.01) |
| H04N 19/14 | (2014.01) |
| H04N 19/105 | (2014.01) |
| H04N 19/176 | (2014.01) |
| H04N 19/172 | (2014.01) |

(52) U.S. Cl.
CPC ... *H04N 19/00157* (2013.01); *H04N 19/00024* (2013.01); *H04N 19/00266* (2013.01); *H04N 19/00278* (2013.01)

(58) Field of Classification Search
None
See application file for complete search history.

(56) References Cited

U.S. PATENT DOCUMENTS

| | | | |
|---|---|---|---|
| 3,825,832 A | 7/1974 | Frei et al. | |
| 4,463,372 A | 7/1984 | Bennett et al. | |
| 4,710,810 A | 12/1987 | Koga | |
| 4,719,642 A | 1/1988 | Lucas | |
| 4,729,127 A | 3/1988 | Chan et al. | |
| 4,736,446 A | 4/1988 | Reynolds et al. | |
| 4,816,906 A | 3/1989 | Kummerfeldt et al. | |
| 4,868,764 A | 9/1989 | Richards | |
| 4,891,748 A | 1/1990 | Mann | |
| 5,068,724 A | 11/1991 | Krause et al. | |
| 5,083,214 A | 1/1992 | Knowles | |
| 5,122,873 A | 6/1992 | Golin | |
| 5,136,371 A | 8/1992 | Savatier et al. | |
| 5,136,376 A | 8/1992 | Yagasaki et al. | |
| 5,148,269 A | 9/1992 | de Haan et al. | |
| 5,164,819 A | 11/1992 | Music | |

(Continued)

FOREIGN PATENT DOCUMENTS

| | | |
|---|---|---|
| EP | 1351510 | 10/2003 |
| GB | 2350515 | 11/2000 |

(Continued)

OTHER PUBLICATIONS

Bankoski et al. "Technical Overview of VP8, An Open Source Video Codec for the Web". Dated Jul. 11, 2011.

(Continued)

*Primary Examiner* — Frederick Bailey
*Assistant Examiner* — Talha M Nawaz
(74) *Attorney, Agent, or Firm* — Young Basile Hanlon & MacFarlane, P.C.

(57) ABSTRACT

Frames of a video stream can be partitioned using source difference variance based partitioning before encoding. Variances between blocks of a current video frame and blocks of a previous unencoded video frame are determined. The current video frame can be partitioned into varying block sizes depending upon the magnitude of the variances. Blocks with low variance may be combined with other low variance blocks to form larger blocks, while blocks with high variance may be further partitioned into smaller blocks to improve encoding efficiency of the blocks. In cases where partitioning of a frame is unlikely to provide improved efficiency, the variation calculations may be skipped in favor of using fixed partitioning.

20 Claims, 10 Drawing Sheets

(56) References Cited

U.S. PATENT DOCUMENTS

| | | |
|---|---|---|
| 5,231,484 A | 7/1993 | Gonzales et al. |
| 5,270,812 A | 12/1993 | Richards |
| 5,274,442 A | 12/1993 | Murakami et al. |
| 5,295,201 A | 3/1994 | Yokohama |
| 5,313,306 A | 5/1994 | Kuban et al. |
| 5,337,086 A | 8/1994 | Fujinami |
| 5,351,086 A | 9/1994 | Park |
| 5,374,958 A | 12/1994 | Yanagihara |
| 5,398,068 A | 3/1995 | Liu et al. |
| 5,432,870 A | 7/1995 | Schwartz |
| 5,452,104 A | 9/1995 | Lee |
| 5,463,701 A | 10/1995 | Kantner, Jr. et al. |
| 5,512,952 A | 4/1996 | Iwamura |
| 5,537,635 A * | 7/1996 | Douglas ............. G06F 12/0866 710/33 |
| 5,561,475 A | 10/1996 | Jung |
| 5,561,477 A | 10/1996 | Polit |
| 5,576,767 A | 11/1996 | Lee et al. |
| 5,589,945 A | 12/1996 | Abecassis |
| 5,596,370 A | 1/1997 | Jung |
| 5,600,773 A * | 2/1997 | Vanover ................. G09G 5/06 345/473 |
| 5,659,539 A | 8/1997 | Porter et al. |
| 5,666,461 A | 9/1997 | Igarashi et al. |
| 5,696,869 A | 12/1997 | Abecassis |
| 5,734,744 A | 3/1998 | Wittenstein et al. |
| 5,748,247 A | 5/1998 | Hu |
| 5,768,533 A | 6/1998 | Ran |
| 5,774,593 A | 6/1998 | Zick et al. |
| 5,777,680 A | 7/1998 | Kim |
| 5,793,647 A | 8/1998 | Hageniers et al. |
| 5,818,969 A | 10/1998 | Astle |
| 5,828,370 A | 10/1998 | Moeller et al. |
| 5,886,742 A | 3/1999 | Hibi et al. |
| 5,903,264 A | 5/1999 | Moeller et al. |
| 5,929,940 A | 7/1999 | Jeannin |
| 5,930,379 A | 7/1999 | Rehg et al. |
| 5,930,493 A | 7/1999 | Ottesen et al. |
| 5,963,203 A | 10/1999 | Goldberg et al. |
| 5,991,447 A | 11/1999 | Eifrig et al. |
| 5,999,641 A | 12/1999 | Miller et al. |
| 5,999,655 A | 12/1999 | Kalker et al. |
| 6,005,980 A | 12/1999 | Eifrig et al. |
| 6,011,872 A | 1/2000 | Qian et al. |
| 6,014,706 A | 1/2000 | Cannon et al. |
| 6,026,183 A | 2/2000 | Talluri et al. |
| 6,035,059 A | 3/2000 | Kurosawa et al. |
| 6,035,060 A | 3/2000 | Chen et al. |
| 6,035,067 A | 3/2000 | Ponticos |
| 6,041,145 A | 3/2000 | Hayashi et al. |
| 6,055,330 A | 4/2000 | Eleftheriadis et al. |
| 6,061,397 A | 5/2000 | Ogura |
| 6,075,875 A | 6/2000 | Gu |
| 6,084,908 A | 7/2000 | Chiang et al. |
| 6,108,383 A | 8/2000 | Miller et al. |
| 6,112,234 A | 8/2000 | Leiper |
| 6,119,154 A | 9/2000 | Weaver et al. |
| 6,141,381 A | 10/2000 | Sugiyama |
| 6,167,164 A | 12/2000 | Lee |
| 6,181,822 B1 | 1/2001 | Miller et al. |
| 6,185,363 B1 | 2/2001 | Dimitrova et al. |
| 6,188,799 B1 | 2/2001 | Tan et al. |
| 6,212,234 B1 | 4/2001 | Andoh et al. |
| 6,222,174 B1 | 4/2001 | Tullis et al. |
| 6,233,017 B1 | 5/2001 | Chaddha |
| 6,240,135 B1 | 5/2001 | Kim |
| 6,249,613 B1 | 6/2001 | Crinon et al. |
| 6,249,614 B1 | 6/2001 | Kolesnik et al. |
| 6,256,423 B1 | 7/2001 | Krishnamurthy et al. |
| 6,271,890 B1 | 8/2001 | Tamir et al. |
| 6,272,179 B1 | 8/2001 | Kadono |
| 6,275,614 B1 | 8/2001 | Krishnamurthy et al. |
| 6,289,049 B1 | 9/2001 | Kim et al. |
| 6,292,837 B1 | 9/2001 | Miller et al. |
| 6,327,304 B1 | 12/2001 | Miller et al. |
| 6,337,917 B1 | 1/2002 | Onural et al. |
| 6,359,929 B1 | 3/2002 | Boon |
| 6,370,267 B1 | 4/2002 | Miller et al. |
| 6,377,709 B1 | 4/2002 | Guillotel |
| 6,381,277 B1 | 4/2002 | Chun et al. |
| 6,400,763 B1 | 6/2002 | Wee |
| 6,427,028 B1 | 7/2002 | Donescu et al. |
| 6,501,860 B1 | 12/2002 | Charrier et al. |
| 6,526,097 B1 | 2/2003 | Sethuraman et al. |
| 6,529,634 B1 | 3/2003 | Thyagarajan et al. |
| 6,529,638 B1 | 3/2003 | Westerman |
| 6,570,924 B1 | 5/2003 | Lynch et al. |
| 6,661,925 B1 | 12/2003 | Pianykh et al. |
| 6,687,303 B1 | 2/2004 | Ishihara |
| 6,697,061 B1 | 2/2004 | Wee et al. |
| 6,707,952 B1 | 3/2004 | Tan et al. |
| 6,711,211 B1 | 3/2004 | Lainema |
| 6,754,266 B2 | 6/2004 | Bahl et al. |
| 6,757,434 B2 | 6/2004 | Miled et al. |
| 6,765,964 B1 | 7/2004 | Conklin |
| 6,909,749 B2 | 6/2005 | Yang et al. |
| 6,985,526 B2 | 1/2006 | Bottreau et al. |
| 6,987,866 B2 | 1/2006 | Hu |
| 6,996,283 B2 | 2/2006 | Thyagarajan |
| 7,010,032 B1 | 3/2006 | Kikuchi et al. |
| 7,027,506 B2 | 4/2006 | Lee et al. |
| 7,027,654 B1 | 4/2006 | Ameres et al. |
| 7,076,113 B2 | 7/2006 | Le Dinh |
| 7,085,319 B2 | 8/2006 | Prakash et al. |
| 7,136,534 B2 | 11/2006 | Thyagarajan et al. |
| 7,143,352 B2 | 11/2006 | Divakaran et al. |
| 7,170,937 B2 | 1/2007 | Zhou |
| 7,227,977 B1 | 6/2007 | Dotsenko |
| 7,236,524 B2 | 6/2007 | Sun et al. |
| 7,263,125 B2 | 8/2007 | Lainema |
| 7,330,509 B2 | 2/2008 | Lu et al. |
| 7,499,492 B1 | 3/2009 | Ameres et al. |
| 7,599,435 B2 | 10/2009 | Marpe et al. |
| 8,116,374 B2 | 2/2012 | Gordon et al. |
| 8,155,454 B2 | 4/2012 | Raveendran |
| 8,170,102 B2 | 5/2012 | Bhaskaran et al. |
| 8,233,676 B2 | 7/2012 | Ngan et al. |
| 8,243,797 B2 | 8/2012 | Lin et al. |
| 8,594,189 B1 | 11/2013 | Bankoski et al. |
| 8,781,004 B1 | 7/2014 | Bankoski et al. |
| 8,891,627 B1 | 11/2014 | Bankoski et al. |
| 2001/0041015 A1 | 11/2001 | Chui |
| 2002/0012471 A1 | 1/2002 | Nayyar |
| 2002/0031272 A1 | 3/2002 | Bagni et al. |
| 2002/0039441 A1 | 4/2002 | Klassen |
| 2002/0080871 A1 | 6/2002 | Fallon et al. |
| 2002/0136448 A1 | 9/2002 | Bortolussi et al. |
| 2002/0145616 A1 | 10/2002 | Doan |
| 2002/0168108 A1 | 11/2002 | Loui et al. |
| 2003/0020260 A1 | 1/2003 | Maxisch |
| 2003/0039307 A1 | 2/2003 | Prakash et al. |
| 2003/0053685 A1 | 3/2003 | Lestideau |
| 2003/0095598 A1 | 5/2003 | Lee et al. |
| 2003/0123545 A1 | 7/2003 | Prakash et al. |
| 2003/0152149 A1 | 8/2003 | Denolf |
| 2003/0161399 A1 | 8/2003 | Ali |
| 2003/0202594 A1 | 10/2003 | Lainema |
| 2004/0120398 A1 | 6/2004 | Zhang et al. |
| 2004/0120400 A1 | 6/2004 | Linzer |
| 2004/0131117 A1 | 7/2004 | Sheraizin et al. |
| 2004/0156549 A1 | 8/2004 | Persiantsev |
| 2004/0179820 A1 | 9/2004 | Kashiwagi et al. |
| 2004/0208392 A1 | 10/2004 | Raveendran et al. |
| 2004/0228410 A1 | 11/2004 | Ameres et al. |
| 2004/0240555 A1 | 12/2004 | De With et al. |
| 2004/0240556 A1 | 12/2004 | Winger et al. |
| 2004/0252886 A1 | 12/2004 | Pan et al. |
| 2005/0013494 A1 | 1/2005 | Srinivasan et al. |
| 2005/0111744 A1 | 5/2005 | Kupeev et al. |
| 2005/0147165 A1 | 7/2005 | Yoo et al. |
| 2005/0152456 A1 | 7/2005 | Orchard et al. |
| 2005/0169374 A1 | 8/2005 | Marpe et al. |
| 2005/0180506 A1 | 8/2005 | Wittebrood et al. |
| 2005/0232351 A1 | 10/2005 | Jung |

(56) References Cited

U.S. PATENT DOCUMENTS

| | | |
|---|---|---|
| 2005/0265447 A1 | 12/2005 | Park |
| 2005/0276497 A1 | 12/2005 | Chen et al. |
| 2006/0078049 A1 | 4/2006 | Bao et al. |
| 2006/0098737 A1 | 5/2006 | Sethuraman et al. |
| 2006/0114995 A1 | 6/2006 | Robey et al. |
| 2006/0114996 A1 | 6/2006 | Thoreau et al. |
| 2006/0126739 A1 | 6/2006 | Stoner |
| 2006/0155398 A1 | 7/2006 | Hoffberg et al. |
| 2006/0165163 A1 | 7/2006 | Burazerovic et al. |
| 2006/0215758 A1 | 9/2006 | Kawashima |
| 2006/0215760 A1* | 9/2006 | Monaco ............ H04N 21/2365 375/240.16 |
| 2006/0239345 A1 | 10/2006 | Taubman et al. |
| 2006/0257048 A1 | 11/2006 | Lin et al. |
| 2007/0025444 A1 | 2/2007 | Okada et al. |
| 2007/0064801 A1 | 3/2007 | Wang et al. |
| 2007/0074266 A1* | 3/2007 | Raveendran ........... H04N 5/144 725/135 |
| 2007/0076947 A1 | 4/2007 | Wang et al. |
| 2007/0115156 A1 | 5/2007 | Lim et al. |
| 2007/0140342 A1 | 6/2007 | Karczewicz et al. |
| 2007/0140346 A1 | 6/2007 | Chen et al. |
| 2007/0165958 A1 | 7/2007 | Picard |
| 2007/0171974 A1 | 7/2007 | Baik |
| 2007/0236513 A1 | 10/2007 | Hedenstroem et al. |
| 2008/0008398 A1 | 1/2008 | Tanaka et al. |
| 2008/0056347 A1 | 3/2008 | Chiu et al. |
| 2008/0063069 A1 | 3/2008 | Sekiguchi et al. |
| 2008/0151101 A1* | 6/2008 | Tian ..................... H04N 5/145 348/448 |
| 2008/0151997 A1 | 6/2008 | Oguz |
| 2008/0152245 A1 | 6/2008 | El-Maleh et al. |
| 2008/0159408 A1 | 7/2008 | Degtyarenko |
| 2008/0175475 A1 | 7/2008 | Sung |
| 2008/0199091 A1 | 8/2008 | Srinivasan et al. |
| 2008/0212678 A1 | 9/2008 | Booth et al. |
| 2008/0246884 A1 | 10/2008 | Chung |
| 2008/0260241 A1 | 10/2008 | Ye et al. |
| 2009/0034619 A1 | 2/2009 | Mukherjee et al. |
| 2009/0097543 A1 | 4/2009 | Pan et al. |
| 2009/0103617 A1 | 4/2009 | Au et al. |
| 2009/0161938 A1 | 6/2009 | Shekhar et al. |
| 2009/0226044 A1 | 9/2009 | Ngan et al. |
| 2009/0262835 A1 | 10/2009 | Srinivasan et al. |
| 2009/0263000 A1 | 10/2009 | Shinagawa et al. |
| 2009/0278961 A1 | 11/2009 | Mohanty et al. |
| 2009/0296814 A1 | 12/2009 | Lin et al. |
| 2009/0304255 A1 | 12/2009 | Hagiwara et al. |
| 2009/0322937 A1 | 12/2009 | Young et al. |
| 2009/0324121 A1 | 12/2009 | Bhagavathy et al. |
| 2010/0020879 A1 | 1/2010 | Pasquier et al. |
| 2010/0054344 A1 | 3/2010 | Puri et al. |
| 2010/0061444 A1 | 3/2010 | Wilkins et al. |
| 2010/0208799 A1 | 8/2010 | Park et al. |
| 2010/0208812 A1 | 8/2010 | Murakami et al. |
| 2010/0208827 A1 | 8/2010 | Divorra Escoda et al. |
| 2010/0246939 A1 | 9/2010 | Aisaka et al. |
| 2010/0246951 A1 | 9/2010 | Chen et al. |
| 2010/0272173 A1 | 10/2010 | Puri et al. |
| 2010/0278271 A1 | 11/2010 | MacInnis |
| 2010/0303150 A1 | 12/2010 | Hsiung et al. |
| 2010/0328538 A1 | 12/2010 | Al-Kadi et al. |
| 2011/0007977 A1 | 1/2011 | Amonou et al. |
| 2011/0019927 A1 | 1/2011 | Nagamatsu |
| 2011/0122950 A1 | 5/2011 | Ji et al. |
| 2011/0182352 A1 | 7/2011 | Pace |
| 2011/0182509 A1 | 7/2011 | Free |
| 2011/0188579 A1 | 8/2011 | Lin et al. |
| 2011/0249756 A1 | 10/2011 | Doepke |
| 2011/0274176 A1 | 11/2011 | Panusopone et al. |
| 2011/0317903 A1 | 12/2011 | Hasslmeyer et al. |
| 2012/0020407 A1 | 1/2012 | Liu et al. |
| 2012/0027083 A1 | 2/2012 | Narroschke et al. |
| 2012/0082238 A1 | 4/2012 | Panusopone et al. |
| 2012/0106650 A1 | 5/2012 | Siegman et al. |
| 2012/0154675 A1* | 6/2012 | Nasu ..................... H04N 7/014 348/452 |
| 2012/0155532 A1 | 6/2012 | Puri et al. |
| 2012/0230418 A1 | 9/2012 | Sole Rojals et al. |
| 2013/0039417 A1 | 2/2013 | Wang et al. |
| 2013/0101019 A1 | 4/2013 | Wilkins et al. |
| 2013/0148729 A1 | 6/2013 | Sasai et al. |
| 2013/0195177 A1 | 8/2013 | Hong et al. |
| 2013/0208784 A1 | 8/2013 | Pietila |
| 2013/0251279 A1 | 9/2013 | Park et al. |
| 2013/0266080 A1 | 10/2013 | Lu et al. |

FOREIGN PATENT DOCUMENTS

| | | |
|---|---|---|
| GB | 2371434 | 7/2002 |
| JP | 2007036888 | 2/2007 |
| KR | 100664929 | 4/2006 |
| WO | WO0207164 | 1/2002 |
| WO | WO0345069 | 5/2003 |
| WO | WO03041405 | 5/2003 |
| WO | WO2006078115 | 7/2006 |
| WO | WO2008002491 | 1/2008 |
| WO | WO2008016605 | 2/2008 |
| WO | WO2009086761 | 7/2009 |
| WO | WO2011087295 | 7/2011 |

OTHER PUBLICATIONS

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Bronshtein I N, et al., "Handbook of Mathematics—Passage", 2004; pp. 194-195.

Carreira, Joao et al. "Constrained Parametric Min-Cuts for Automatic Object Segmentation", 2010 IEEE Conference on Computer Vision and Pattern Recognition (CVPR), San Francisco, CA, Jun. 13-18, 2010.

Chen et al. (Predictive Video Decoding Based on Ordinal Depth of Moing Regions, IEEE Proceedings of ICC 2010).

Flexible Macroblock Ordering; Wikipedia; Jul. 15, 2008.

Giovani Gomez, et al. Automatic feature constructions and a simple rule induction algorithm for skin detection, itesm capus cuernavaca, paseo de la reforma 182 A, Temixo, Morelos 62589, Mexico, 8 pages. 2002.

Guo, Liwei, Peng Yin, and Edouard Francois, "TE3: Simplified Geometry Block Partitioning", Joint Collaborative Team on Video (JTC-VC) of ITU-T SG16 WP3 and ISO/IEC JTC1/SC29?WG11, 2nd Meeting : Geneva, CH Jul. 21-28, 2010.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

ISO/IEC: "Information Technology—Coding of audio-visual objects" Retrieved from the internet: Http://kazus.ru/nuke/modules/downloads/pub/144/0/ISO-IEC-14496-2-2001.

ISR & Written Opinion , RE: Application # PCT/US2011/035720; Aug. 19, 2011.

ISR & Written Opinion, RE: Application # PCT/US2012/050042; Oct. 30, 2012.

ISR and Written opinion of the International Searching Authoriy for International Application No. PCT/US13/24782, dated Apr. 16, 2013, 19 pages.

Jure Kovac, et al., Human Skin Colour Clustering for Face Detection, University of Ljubljana, Slovenia, 5 pages.

Karczewicz, Marta, Peisong Chen, Rajan Joshi, Xianglin Wang, and Wei-Jung Chien, "Video coding technology proposal by Qualcomm Inc.", Joint Collaborative Team on Video Coding (JTC-VC) of ITU-T SG16 WP3 and ISO/IEC JTC1/SC29/WG11, 1st Meeting: Dresden, DE Apr. 15-23, 2010.

Kondo S, et al.,"A Motion Compensation Technique Using Sliced Blocks in Hybrid Video Coding", Proceedings of the 2005 International Conference on Image Processing , vol. 2, Sep. 11, 2005; pp. 305-308.

(56) References Cited

OTHER PUBLICATIONS

Lee et al, Bit Allocation for MPEG-4 Video Coding with Spatio-Temporal Tradeoffs, Jun. 2003, pp. 488-502, [retrieved from Internet on Jul. 19, 2011] <URL:http://ieeexplore.ieee.org/stamp/stamp.jsp?tp=&arnumber=1207406>.
Liu et al., "Evaluations and Suggestions about TU Representation", No. JCTVC-E883, Mar. 9, 2011.
M. Bierling, Displacement estimation by hierarchical blockmatching. 1998, in Proceedings of SPIE Visual Communications and Image Processing 88, p. 942-951.
Marcos Nieto, Luis Salgado, Narciso Garcia; Fast Mode Decision Based on Activity Segmentation in H.264/AVC Encoding; Grupo de Tratamiento de Imagenes—E.T.S. Ingenieros de Telecomunicacion, Universidad Politecnica de Madrid, Spain; Springer-Verlag Berlin Heidelberg 2006.
McCann et al., "HEVC Test Model 3 (HM 3) Encoder Description," No. JCTVC-E682, Mar. 29, 2011.
Moschetti et al, Automatic Object Extraction and Dynamic Bitrate Allocation for Second Generation Video Coding, Multimedia and Expo, 2002. ICME '02 Proceedings. 2002 IEEE International Conference on Lausanne, Switzerland, Aug. 26, 2002, pp. 493-496, vol. 1,Piscataway, New Jersey, USA.
Mozilla, "Introduction to Video Coding Part 1: Transform Coding", Video Compression Overview, Mar. 2012, 171 pp.
Nunes P et al, Rate Control for Scenes with Multiple Arbitrarily Shaped Video Objects, ITG Fachberichte, Jan. 1, 1997, pp. 303-308, Berlin, Germany.
Overview; VP7 Data Format and Decoder. Version 1.5. On2 Technologies, Inc. Dated Mar. 28, 2005.
Panusopone et al., "JCT-VC AHG report: Coding block Structures," No. JCTVC-E887, Mar. 14, 2011.
Panusopone et al., "RQT with rectangular transform unit support," Document JCTVC-F578-r3, 6th Meeting; Torino, Italy, Jul. 14-22, 2011.
Panusopone, et al., "Efficient Transform Unit Representation," 4. JCT-VC Meeting;95 MPEG Meeting; Jan. 20, 2011-Jan. 28, 2011; Daegu; (Joint Collaborative Team on Video Coding of ISO/IEC JTC1/SC29/WG11 and ITU-T SG16); Jan. 15, 2011.
Panusopone, et al., "Evaluation of RQT in HM and related TU representation" JCT-VC Meeting; Mpeg Meeting; Mar. 23, 2011; Geneva.
Pascal Fleury et al: "MPEG-4 video verification model: A solution for interactive multimedia applications" Journal of Electronic Imaging, SPIE/IS&T; Engineering Information Inc.; vol. 7, Jul. 1, 1998, pp. 502-515.
Paul et al. ("Video coding focusing on block partitioning and occlusion," IEEE Transactions on Image Processing, vol. 19, No. 3, Mar. 2010, 691-701)-discloses pattern-based coding that divides a frame using different block shapes and sizes.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Sun Y et al, Asynchronous Rate Control for Multi-Object Videos, IEEE Transactions on Circuits and Systems for Video Technology, Aug. 1, 2005, pp. 1007-1018, vol. 15, No. 8 [retrieved from Internet on Jul. 19, 2011] <URL:http://ieeexplore. ieee.org/stamp/stamp.jsp?tp=&arnumber=1490554>.
Tan,et al., "RQT depth selection", MPEG Meeting; Geneva; (Motion Picture Expert Group); Mar. 20, 2011.
Tarek Mahmound, A new fast skin color detection technique, Worl Academy of Science, Engineering and Technology 43 2008, 5 pages.
Vladimir Vezhnevets, et al., A Survey on Pixel Based Skin Color Detection Techniques, Graphics and Media Laboratory, Moscow Russia, 8 pages, 2003.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wiegand et al., "WD2: Working Draft 2 of High-Efficiency Video Coding," JCTVC-D503, Jan. 2011.
Wien et al., "H.26L Core Experiment Description for Adaptive Block Transforms," Video Coding Experts Group of ITU-T SG.16; Portland, Oregon; Aug. 2000.
Yu et al., "Adaptive Scan for Large Blocks for HEVC," Joint Collaborative Team on Video Coding, Torino, Jul. 2011.
Yuan, et al., "CE2: Non-Square Quadtree Transform for symmetricand asymmetric motion partitions," JCTVC-F410, 6th Meeting: Torino, IT, Jul. 14-22, 2011.
Congxia Dai; Escoda, O.D.; Peng Yin; Xin Li; Gomila, C., "Geometry-Adaptive Block Partitioning for Intra Prediction in Image & Video Coding," Image Processing, 2007. ICP 2007. IEEE International Conference on, vol. 6, no., pp. VI-85, VI-88, Sep. 16, 2007-Oct. 19, 2007.
Ferreira, R. U. et al., "Efficiency Improvements for a Geometric-Partition-Based Video Coder", Image Processing (ICIP), 2009 16th IEEE International Conference Nov. 2009.
Guo L, et al. "TE3: Simplified Geometry Block Partitioning", JCT-VC (Joint Collaborative Team on Video Coding) Meeting Jul. 21-Jul. 28, 2010.
ISR & Written Opinion, RE: Application # PCT/US2011/053761; Nov. 29, 2011.
Kim, M.,"Tool Experiment 9: Large Black Structure", Joint Collaborative Team on Video Coding (JCT-VCB309), Jul. 2010.
Krit Panusopone et al., "Flexible Picture Partitioning", JCT-VC (Joint Collaborative Team on Video Coding) JCTVC-C260, Meeting, Oct. 7-15, 2010.
Krit Panusopone, et al. "Efficient Transform Unit Representation," Joint Collaborative Team on Video Coding (JCT-VC) of UTU-T SG16 WP3 and ISO/IEC JTC1/SC29/WG11 4nd Meeting: Daegu, KR, Jan. 22, 2011.
Papathanassiadis T., "Image Block Partitioning: A Compression Technique Suitable fo Parallel Processing", Image Processing and Its Applications, 1992. International Conference on Maastricht, Netherlands, London, UK. Jan. 1, 1992.
Sullivan, G. J. et al., "Recent developments in standardization of high efficiency video coding (HEVC)", Society of Photo-Optical Instrumentation Engineers 2010.
Yuan, et al., "Asymmetric motion partition with OBMC and Non-Square TU," Mar. 2011, JCTVE-E376 (version 4).

\* cited by examiner

VIDEO CODING USING ADAPTIVE SOURCE VARIANCE BASED PARTITIONING

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Real-time video streaming, multi-point video conferencing or video broadcasting are examples of applications that employ video stream encoding including compression. In addition to the resources required for storage and transmission of encoded video streams, the encoding itself can require computing resources.

SUMMARY

This disclosure relates in general to encoding and decoding visual data, such as video stream data, for transmission or storage using adaptive source variance based partitioning. One method taught herein describes periodically sampling a plurality of frames of a video stream to obtain a current frame for partitioning at a frame interval, performing source difference variance based partitioning of the current frame, partitioning the current frame according to one or more selected partition sizes for each of the plurality of blocks of the current frame to form a partitioned current frame, and encoding the partitioned current frame for inclusion in a bitstream. The source difference variance based partitioning includes, for each block of the plurality of blocks of the current frame, partitioning the block into a plurality of first partitioned blocks having a first partition size, the block having a size at least as large at the first partition size and the first partition size corresponding to one of at least two available partition sizes. The source difference variance based partitioning also includes, for each first partitioned block having the first partition size, calculating a variance value based on differences between pixels of the first partitioned block and pixels of a spatially correspondent block in a previous frame, if the variance value for the first partitioned block is within a first defined range, selecting the first partition size for the pixels of the first partitioned block, and if the variance value for the first partitioned block is outside the first defined range, selecting a smaller partition size than the first partition size for the pixels of the first partitioned block.

An apparatus described herein includes a memory and a processor. According to one implementation, the processor is configured to execute instructions stored in the memory to periodically sample a plurality of frames of a video stream to obtain a current frame for partitioning at a frame interval and perform source difference variance based partitioning of the current frame, the source difference variance based partitioning including, for each block of a plurality of blocks of the current frame, partitioning the block into a plurality of first partitioned blocks having a first partition size, the block having a size at least as large at the first partition size and the first partition size corresponding to one of at least two available partition sizes and then, for each first partitioned block having the first partition size, calculating a variance value based on differences between pixels of the first partitioned block and pixels of a spatially correspondent block in a previous frame, if the variance value for the first partitioned block is within a first defined range, selecting the first partition size for the pixels of the first partitioned block, and if the variance value for the first partitioned block is outside the first defined range, selecting a smaller partition size than the first partition size for the pixels of the first partitioned block. The processor is further configured to partition the current frame according to one or more selected partition sizes for each of the plurality of blocks to form a partitioned current frame and encode the partitioned current frame for inclusion in a bitstream.

Variations in these and other aspects of this disclosure will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

A video stream may be compressed by a variety of techniques to reduce bandwidth required transmit or store the video stream. A video stream can be encoded into a bitstream, which can involve compression, and then transmitted to a decoder that can decode or decompress the video stream to prepare it for viewing or further processing. Encoding a video stream can involve parameters that make trade-offs between video quality and bitstream size, where increasing the perceived quality of a decoded video stream can increase the number of bits required to transmit or store the bitstream.

Figure 6:
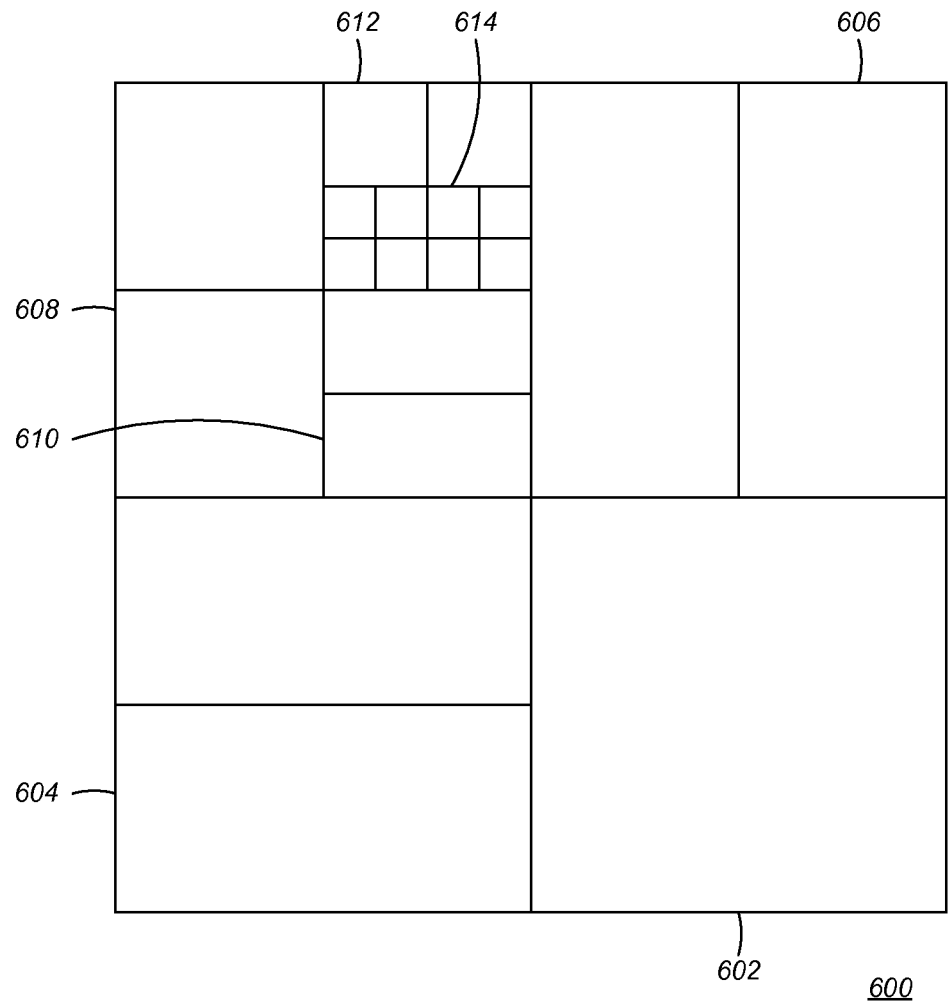
FIG. 6 is a diagram showing partitions of video data used to explain the teachings herein.

A video frame can be partitioned into rectangular or square partitions or blocks as part of the encoding process. FIG. 6 is a diagram of a portion 600 of a video frame partitioned into smaller blocks. In this example, portion 600 forms a block with dimensions of 64 pixels by 64 pixels. Portion 600 as shown is partitioned into one 32×32 block 602, two 32×16 blocks 604, two 16×32 blocks 606, two 16×16 blocks 608, two 16×8 blocks 610 and two 8×8 blocks 612 and eight 4×4 blocks 614. "Partitioning" may be defined as dividing a subset of the pixels of a video frame into an arrangement of blocks of possibly varying sizes such that the blocks tile the video frame with contiguous, non-overlapping blocks that include all of the subset of pixels.

Determination of the optimal partitioning scheme for a video frame can be a computationally-intensive process. For example, an encoder may use a rate/distortion (RD) loop that determines a trade-off between video quality and bitstream size by forming all possible partitioning schemes, encoding each and calculating a "rate" or bitstream size of each with an associated level of "distortion" or error in video quality. The partitioning scheme that results in best video quality at a given compression rate is generally selected from the available partitioning schemes. This process may consume up to 50% of the computing time required to encode a video stream. As such, it is not generally suitable for real-time situations such as video conferencing and live streaming, where low-latency, fast encoding is critical.

Fixed partitioning, i.e., where the same size blocks are always used, is an option for real-time coding, but fixed partitioning does not always give the best encoding result since any individual partition may have pixels exhibiting static or slow-motion as well as pixels exhibiting fast-motion. An alternative option is to reduce the amount of time spent in the partitioning process while still attempting to obtain some of the benefits of partitioning. For example, the RD loop may not be performed for every frame. The last frame's partitioning may be copied and used for the current frame in one such case. This technique can result in imprecise partitioning when the current frame has different motion from the last frame. In a different technique, the current frame may be compared with a reconstructed last frame to decide partitioning. Where the reconstructed last frame is used as a reference frame in encoding, it is convenient to use it for the partitioning decision. However, the reconstructed frame possesses encoding errors due to the, e.g. lossy, compression used in its encoding. The differences between it and the current frame are attributable to both motion and encoding errors, and therefore do not provide a correct indicator of the actual motion in the current frame.

In contrast, the teachings herein describe a novel adaptive partitioning that is based on the variance of a source difference. Broadly, variances are measured between the current raw or unencoded video frame and a temporally nearby raw or unencoded video frame on a block-by-block basis to determine a partition scheme for blocks of a frame. The result is improved real-time encoding performance over existing techniques that achieves the goals of fast encoding and good compressed video quality. Further details are described after an initial discussion of the environment in which the teachings herein may be used.

Figure 1:
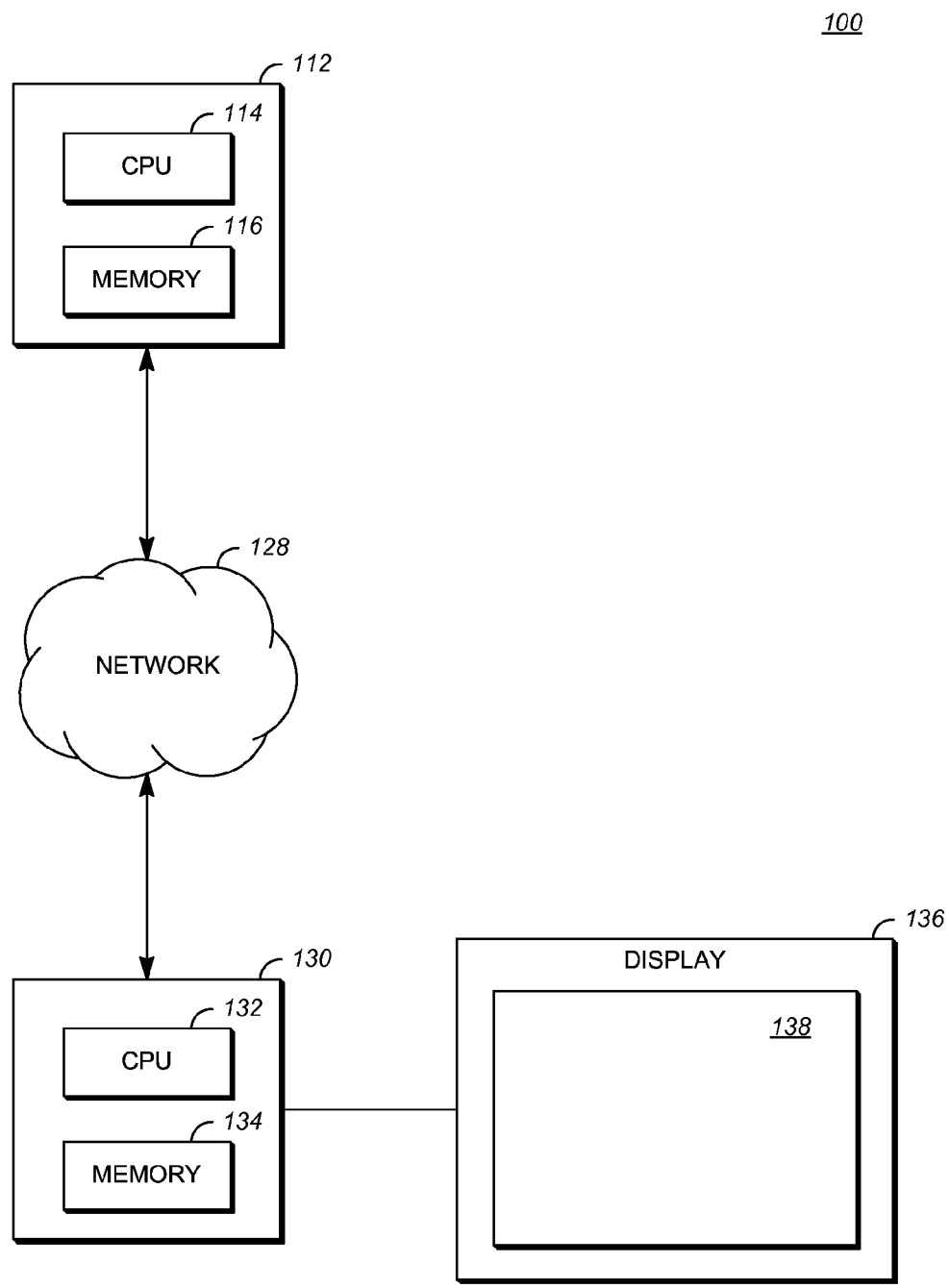
FIG. 1 is a schematic of a video encoding and decoding system.

FIG. 1 is a schematic of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
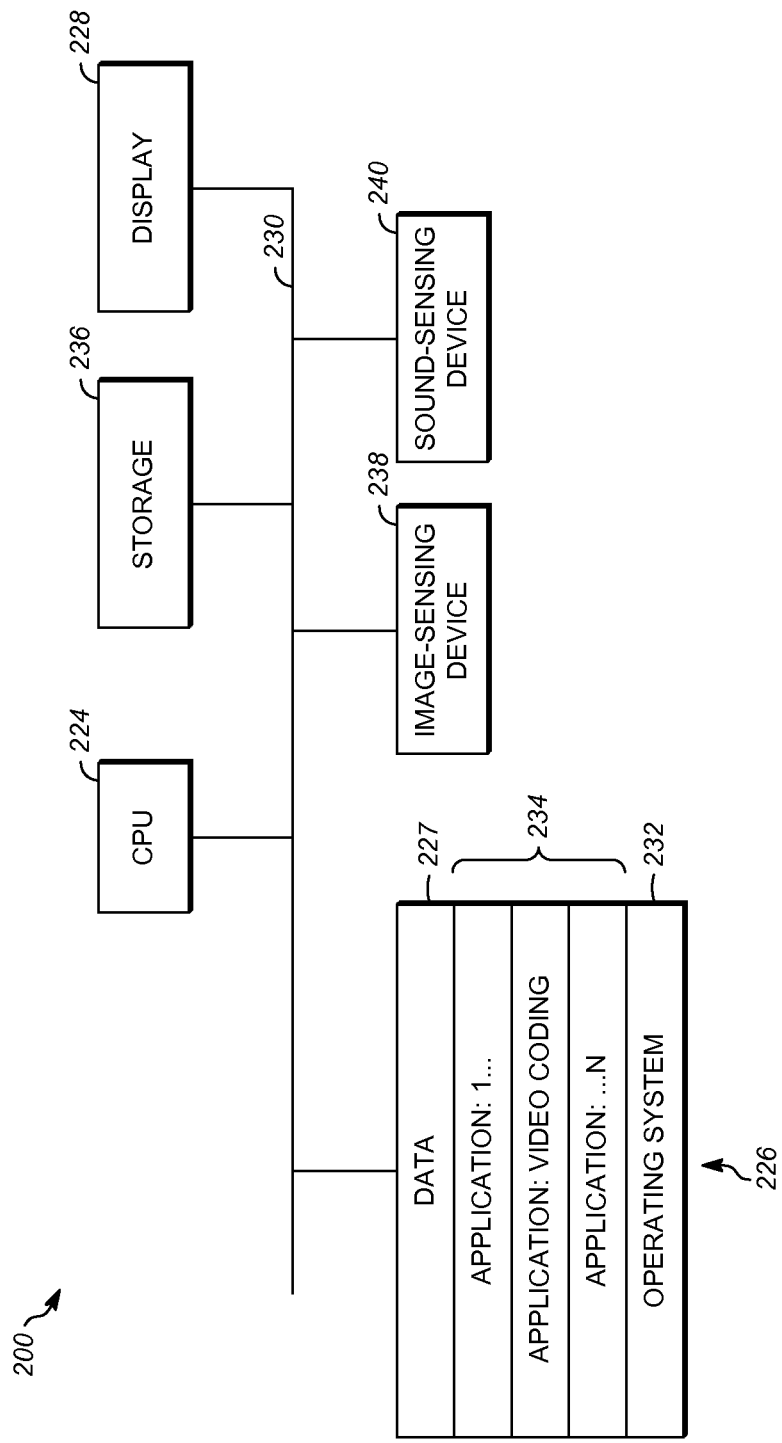
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

When used in a video conferencing system, for example, transmitting station 112 and/or receiving station 130 may include the ability to both encode and decode a video stream as described below. For example, receiving station 130 could be a video conference participant who receives an encoded video bitstream from a video conference server (e.g., transmitting station 112) to decode and view and further encodes and transmits its own video bitstream to the video conference server for decoding and viewing by other participants.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a video coding application that performs the methods described here. Computing device 200 can also include a secondary storage 236, which can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
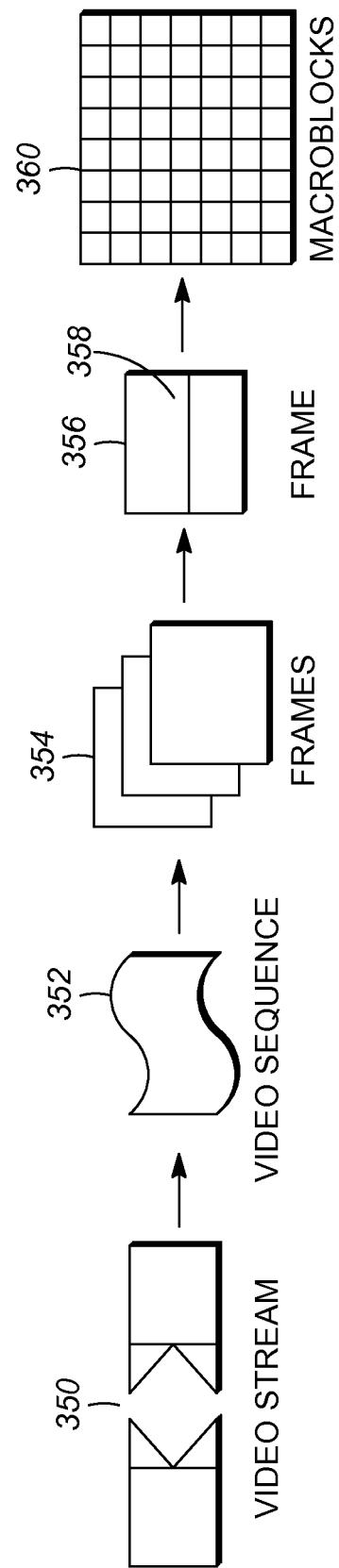
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames 354. Adjacent frames 354 can then be further subdivided into individual frames, e.g., a single frame 356. At the next level, a single frame 356 can be divided into a series of segments or planes 358. Segments (or planes) 358 can be subsets of frames that permit parallel processing, for example. Segments 358 can also be subsets of frames that can separate the video data into separate colors. For example, a frame 356 of color video data can include a luminance plane and two chrominance planes. Segments 358 may be sampled at different resolutions.

Whether or not frame 356 is divided into segments 358, frame 356 may be further subdivided into blocks 360, which can contain data corresponding to, for example, 16×16 pixels in frame 356. Blocks 360 can also be arranged to include data from one or more planes of pixel data. Blocks 360 can also be of any other suitable size such as 4×4 pixels, 8×8 pixels, 16×8 pixels, 8×16 pixels, 16×16 pixels or larger. Unless otherwise noted, the terms block and macroblock are used interchangeably herein. Frame 356 may be partitioned according to the teachings herein as discussed in more detail below.

Figure 4:
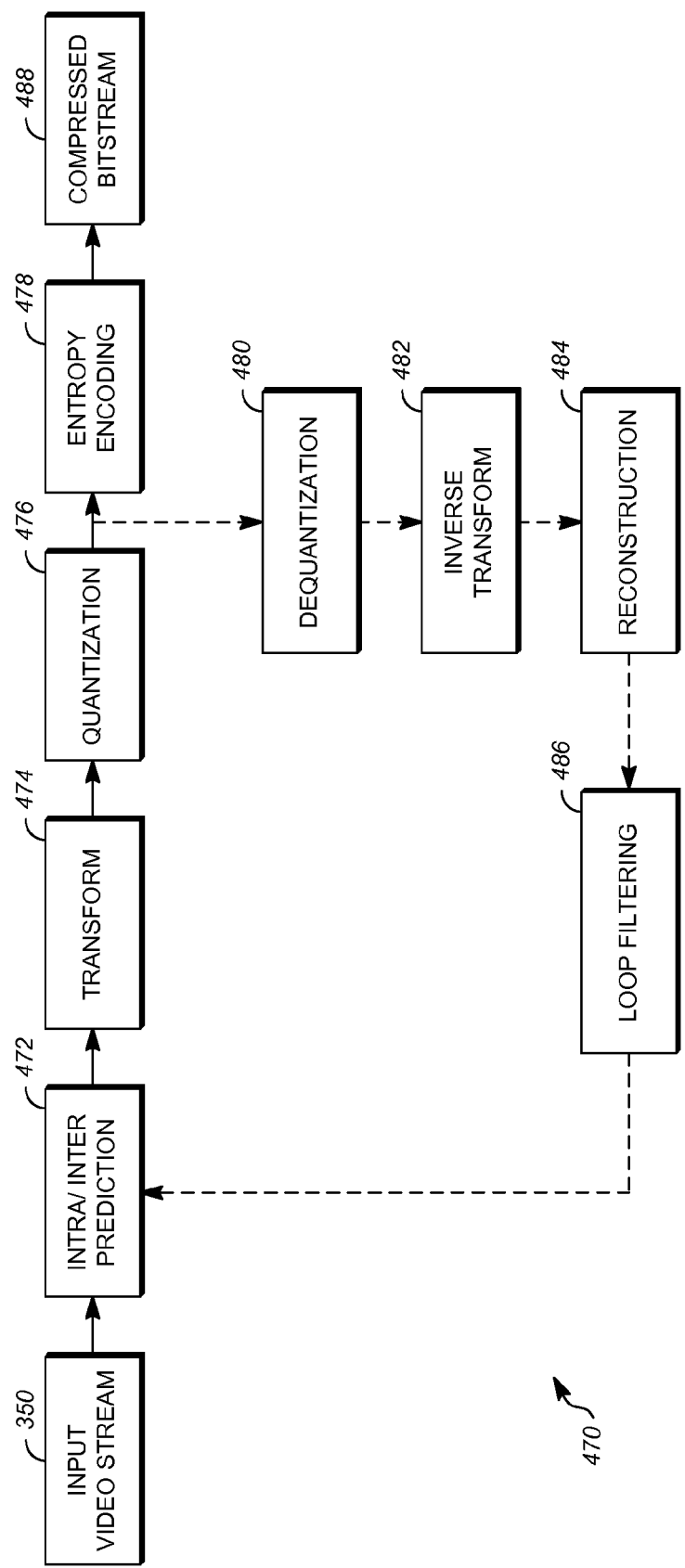
FIG. 4 is a block diagram of a video compression system in according to an aspect of the teachings herein.

FIG. 4 is a block diagram of an encoder 470 in accordance with an implementation. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 4, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 can be processed in units of blocks. At intra/inter prediction stage 472, each block can be encoded using intra-frame prediction (also called intra prediction) or inter-frame prediction (also called inter prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. The blocks are predicted as partitioned according to the teachings herein in a separate process before the prediction of inter/intra prediction stage 472 and may be performed within the inter/inter prediction stage 472.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), the Singular Value Decomposition Transform (SVD) and the Asymmetric Discrete Sine Transform (ADST). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix. Note that the size of the prediction block may be different from the size of the transform block.

Quantization stage 476 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by entropy encoding stage 478 as discussed in additional detail herein. The entropy-encoded coefficients, together with other information used to decode the block, which may include for example the type of prediction used, motion vectors and quantizer value, are then output to the compressed bitstream 488. Compressed bitstream 488 can be formatted using various techniques, such as variable length coding (VLC) or arithmetic coding. Compressed bitstream 488 can also be referred to as an encoded video stream or encoded video bitstream, and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474 for certain blocks or frames. In another implementation, an encoder 470 can have quantization stage 476 and dequantization stage 480 combined into a single stage.

Figure 5:
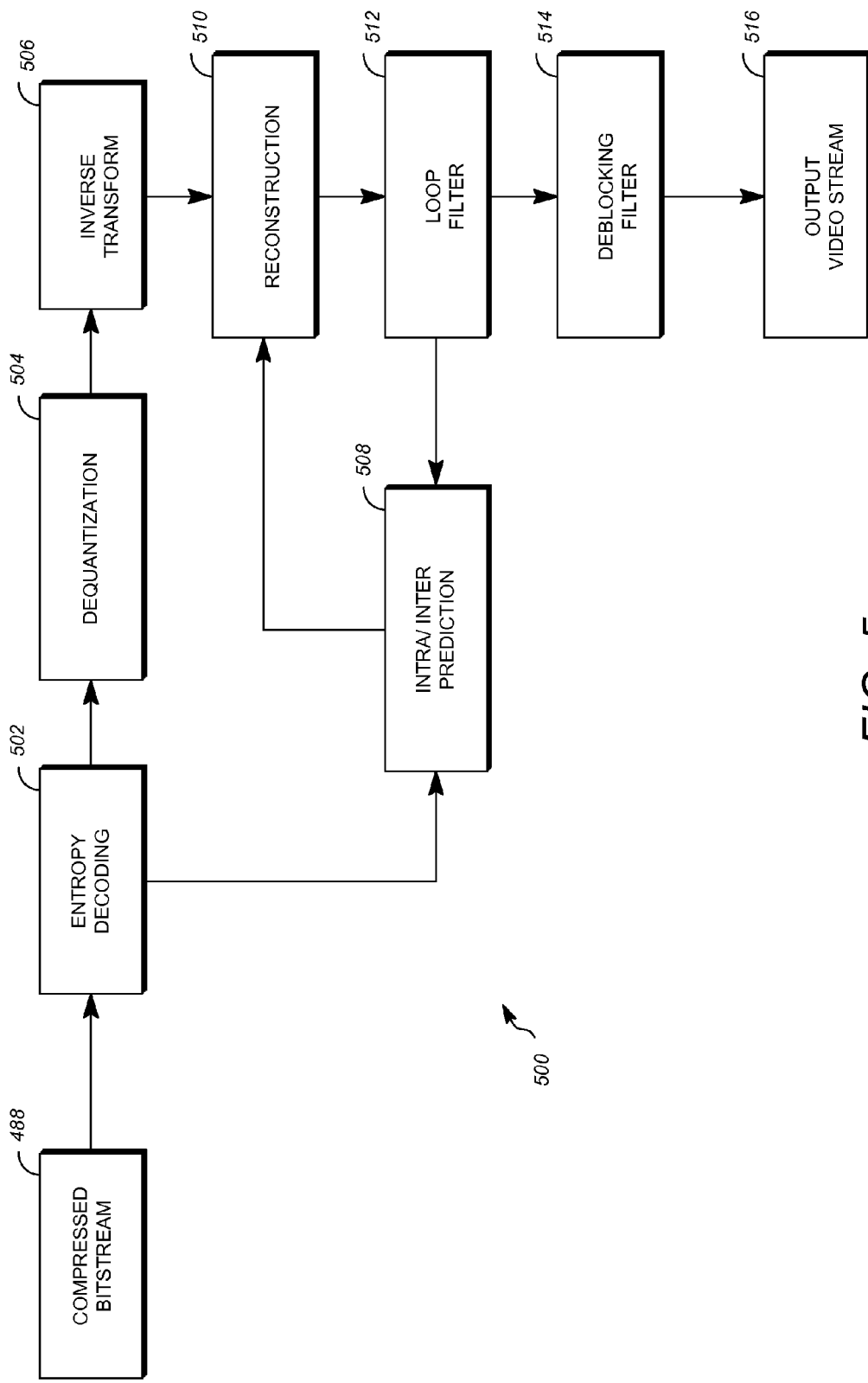
FIG. 5 is a block diagram of a video decompression system according to another aspect of the teachings herein.

FIG. 5 is a block diagram of a decoder 500 in accordance with another implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 as discussed in additional detail herein to produce a set of quantized transform coefficients. Dequantization stage 504 dequantizes the quantized transform coefficients (e.g., by multiplying the quantized transform coefficients by the quantizer value), and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. In this example, deblocking filtering stage 514 is applied to the reconstructed block to reduce blocking distortion, and the result is output as output video stream 516. Output video stream 516 can also be referred to as a decoded video stream, and the terms will be used interchangeably herein.

Other variations of decoder 500 can be used to decode compressed bitstream 488. For example, decoder 500 can produce output video stream 516 without deblocking filtering stage 514.

As mentioned above, partitioning large blocks of a video frame into smaller blocks of different dimensions may result in fast, efficient encoding with good image quality. The strategies to partition the frame herein are initially described with respect to a specific example, but are not limited thereto. Generally, the determination of the partitioning scheme for the current frame starts with comparing a block of a current video frame with a corresponding block from a previous video frame. Each of these frames may be referred to as source frames as they include raw, unencoded data—not reconstructed data generated from previously-encoded frames. For purposes of explanation, a block is referred to as a superblock herein when it has a block size of 64×64 pixels. The partitioning may be decided at more than one block size level. The block levels may be selected based on the minimum partition size and the maximum partition size. For example, where the frame is processed by groups of pixels forming superblocks, and the smallest partition is 8×8 pixels, the partitioning may be decided at three block size levels: 16×16 pixels, 32×32 pixels and 64×64 pixels. As described in additional detail hereinafter, the variances of the source differences at the different block size levels are compared to thresholds to decide whether the superblock is formed of 8×8 partitions, 16×16 partitions, 32×32 partitions and/or a 64×64 partition. The thresholds may be based on the noise level in the source video and selected such that smaller variances result in larger partitions. This is referred to as source difference variance based partitioning hereinafter and is described in additional detail below.

Source difference variance based partitioning can improve encoder performance if there is at least one relatively large static or slow motion area in a frame. If, however, there is no such area, the source difference variance based partitioning will result in using small partition sizes most of the time. The encoder performance will not be improved to any significant degree over using a fixed small partition size such as 16×16. Accordingly, an adaptive partitioning method that switches between fixed partitioning and source difference variance based partitioning is described with reference to FIG. 7.

Figure 7:
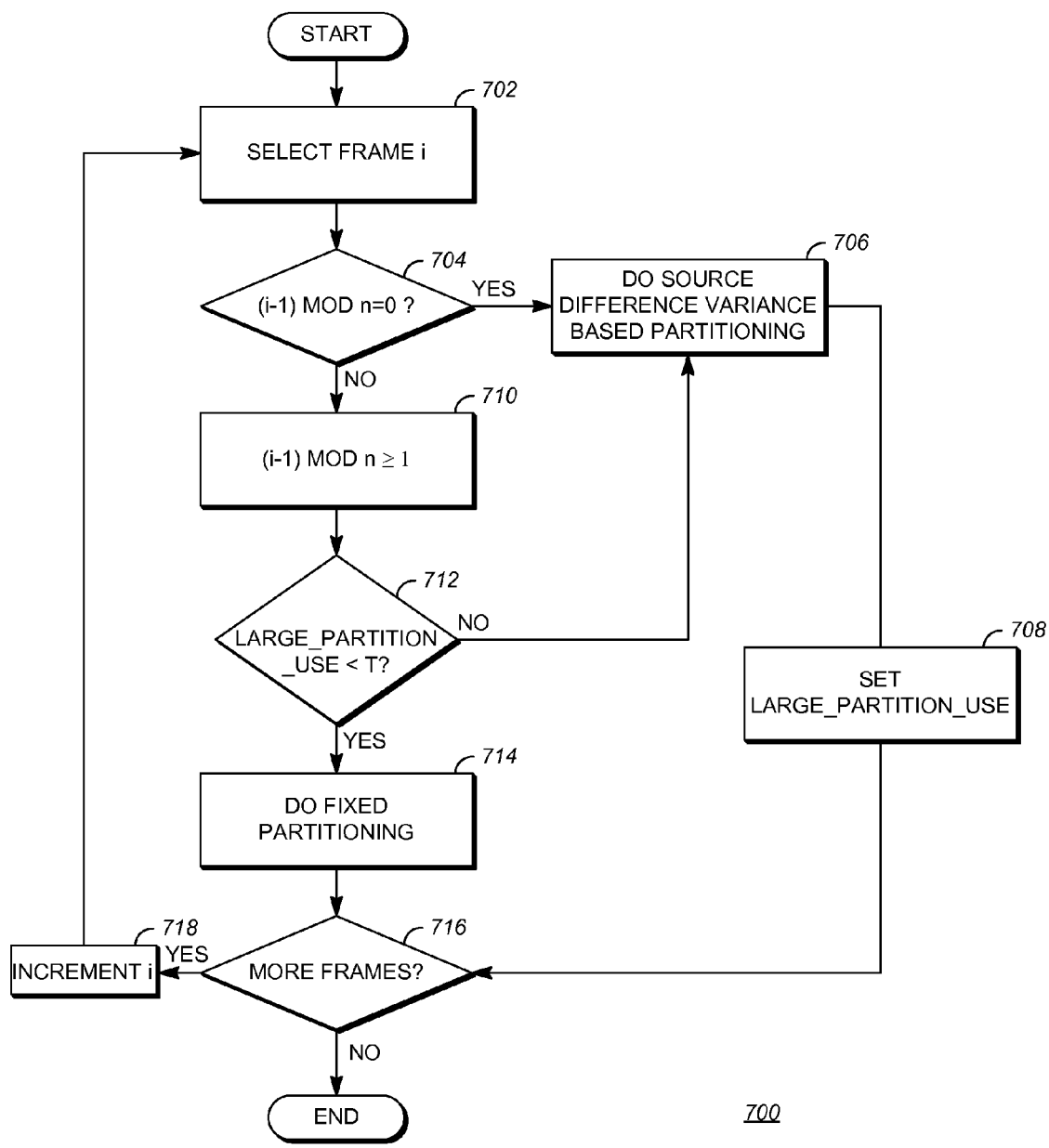
FIG. 7 is a flowchart diagram of a process for partitioning video frames of a video stream for encoding using adaptive source variance-based partitioning.

FIG. 7 is a flowchart diagram of a process 700 for partitioning video frames of a video stream for encoding using adaptive source variance-based partitioning. Process 700 can be implemented in a system such as computing device 200 to aid the encoding of a video stream. Process 700 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 700. Process 700 can also be implemented using hardware in whole or in part. As explained above, some computing devices may have multiple memories and multiple processors, and the steps of process 700 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, process 700 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter. Process 700 assumes that a previous unencoded frame of video data is available in addition to the current unencoded frame of video data. Process 700 uses these unencoded or source frames in order to obtain an accurate measure of the variance. As mentioned briefly above, encoding a frame followed by decoding can create an approximation of the original frame that may alter the video data enough to cause the variance measure to become less indicative of the contents of the video frame than source original unencoded data.

Process 700 receives frames of video data from a video stream in the order in which they occur in the video stream. Some frames are processed using full source difference partitioning and some frames are processed using partition information from a previous frame. Broadly, as long as the previous frame was partitioned into at least a minimum number (e.g., s percentage) of relatively large blocks, the current frame is processed using source difference variance based partitioning. Where the previous frame was partitioned into fewer than the minimum percentage of relatively large blocks (e.g., many small blocks are in the partitioning), fixed partitioning is used for the current frame without calculating the variances. Process 700 also periodically forces frames at a frame interval n to undergo source difference variance based partitioning. In this way, process 700 switches between fixed partitioning and source difference variance based partitioning adaptively according to how large the static or slow motion areas are in a frame. Moreover, parts of a video sequence may contain fast motion, while others contain slow motion. Different partitioning methods are thus desirably applied to different parts of the video. Re-evaluating motion every n frames addresses such a concern. Process 700 performs this process by using a modulo function as described hereinafter. However, this is only one example of a technique to achieve the goal of partitioning frames in a video stream using source difference variance based partitioning to improve encoder performance without calculating variances for every frame.

At the start of process 700, initialization occurs. During initialization, frame interval n may be set. Frame interval n is a positive integer and may be as small as 1. A more desirable value is, for example, 10 and could depend on the expected motion within the frame. Video streams with a lot of motion may desirably use lower values of frame interval n than video streams with little motion. In addition, a variable referred to herein as LARGE_PARTITION_USE, which stores the percentage of blocks in a frame that use partition sizes that are larger than a minimum partition size can be defined and initialized. This variable accumulates a count equal to the number of blocks of a frame determined to use a large partition size by the source difference variance based partitioning described in detail below with respect to FIGS. 8, 9 and 10. It is compared to another variable, threshold T, described in more detail below. LARGE_PARTITION_USE may be initialized to zero at the beginning of processing a video stream. Finally, a successive integer i is assigned to each video frame of a video stream by process 700 as it is received. This index i keeps track of the frame interval for motion checking. By performing a source difference variance based partitioning at fixed intervals, process 700 can accommodate motion in the input video frames while avoiding having to check for motion in every frame, which can take additional processing time without providing further encoding efficiencies.

At step 702, a current frame of video data with index i is selected from a video stream. Process 700 as shown assumes that index i is greater than 0. At step 704, the value 1 is subtracted from index i, and the modulus of i−1 with respect to frame interval n is formed. If (i−1) mod n=0, then the current frame index minus 1 is an integer multiple of n. Process 700 advances to step 706 to perform source difference variance based partitioning at described in more detail with respect to FIGS. 8, 9 and 10. The blocks that use partition sizes of equal to or greater than a relatively large partition size, for example partition sizes equal to or greater than 32×32 pixels when the frame is processed in units of superblocks, are accumulated to set the value LARGE_PARTITION_USE at step 708, replacing any previous value.

If, at step 704, i−1 mod n #0, then i−1 mod n>0 at step 710. Process 700 advances to step 712 to compare LARGE_PARTITION_USE to threshold T. If LARGE_PARTITION_USE is greater than or equal to threshold T, process 700 branches to step 706 to perform source difference variance based partitioning. If LARGE_PARTITION_USE is less than threshold T at step 712, process 700 advances to step 714. The current frame (index i) is partitioned using fixed partitioning. For example, superblocks of a frame comprising 64×64 pixels may each be partitioned into sub-blocks of the same dimensions, such 16×16 pixels. Another option is to use the partitions generated for the most recent previous frame by the source difference variance based partitioning for the superblocks of the current frame. Threshold T can be selected to balance processing time against increased coding efficiency due to better partitioning based on experience or experimentation. One possible value of threshold T is 15%.

Whether a frame is subjected to source difference variance based partitioning in step 706 or to fixed partitioning in step 714, process 700 checks to see whether the current frame is the last frame of the video stream at step 716. If not, process 700 repeats for the next frame by incrementing i at step 718 and selecting the next frame i as the current frame. If the current frame is the last frame at step 716, process 700 ends. Either after or concurrently with process 700, each frame after partitioning is encoded into a bitstream, such as compressed bitstream 488, for storage or transmission as described above. Namely, the partitions may be inter- or intra-predicted to generate respective prediction blocks. The resulting residuals are then transformed and quantized, or quantized only, before being provided to entropy coding stage 478 of encoder 470 for coding into bitstream 488.

Figure 8:
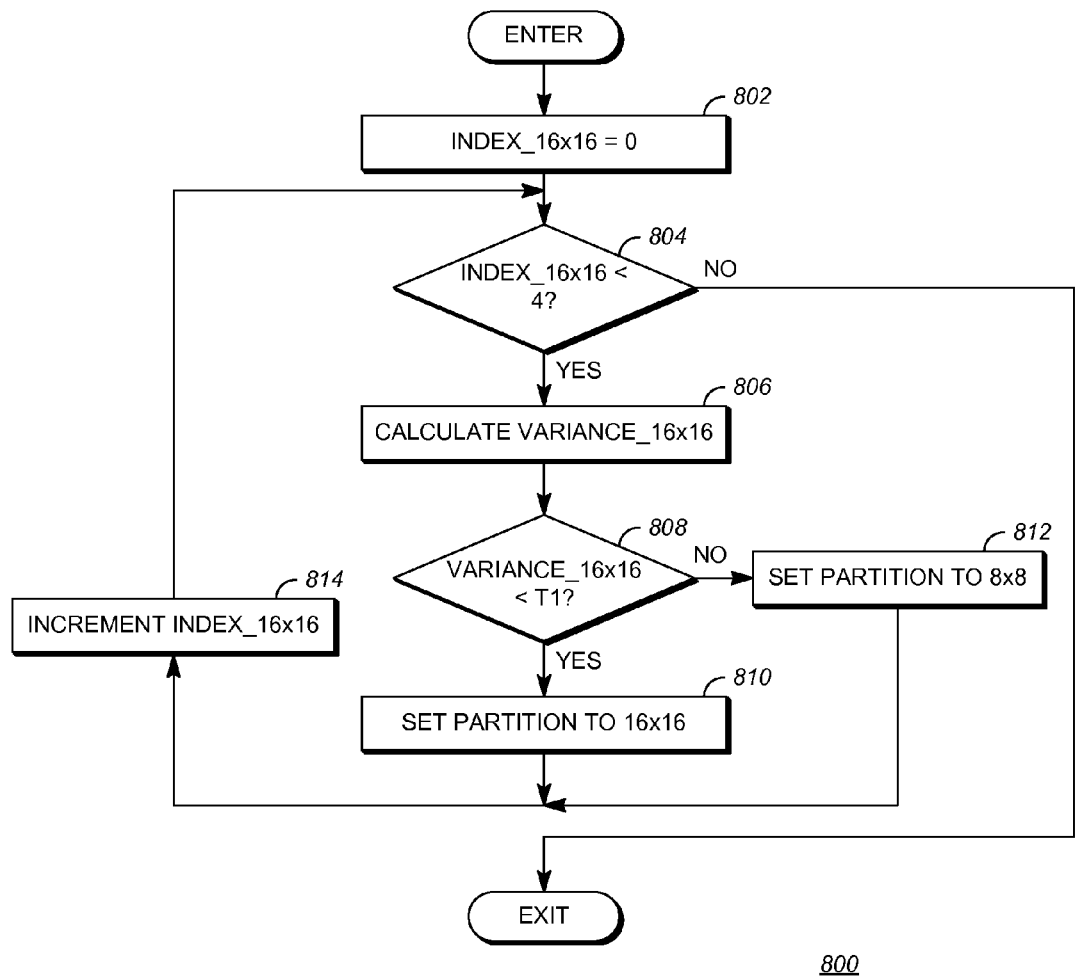
FIG. 8 is a flowchart diagram of a process for partitioning blocks of a video frame according to an aspect of the teachings herein.
Figure 9:
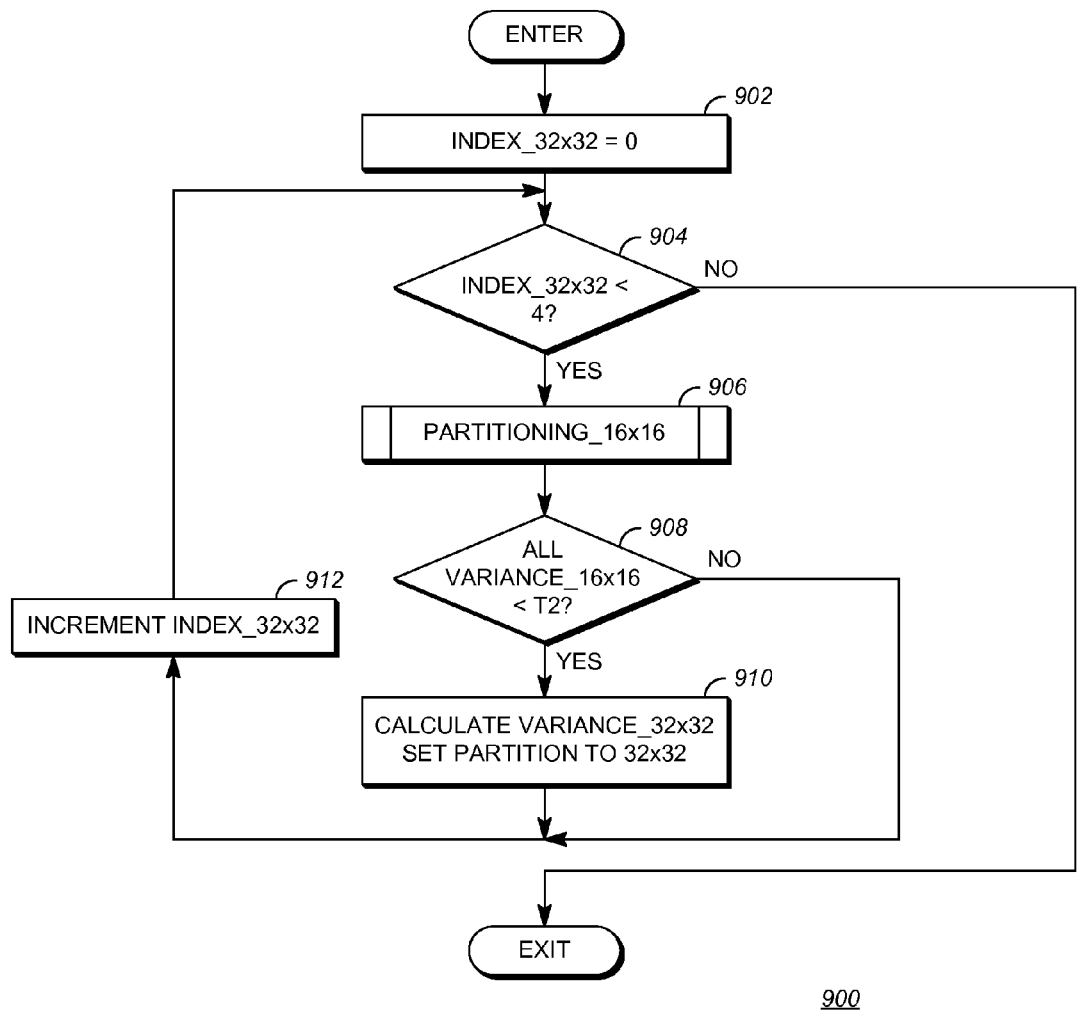
FIG. 9 is a flowchart diagram of a process for partitioning blocks of a video frame according to another aspect of the teachings herein.
Figure 10:
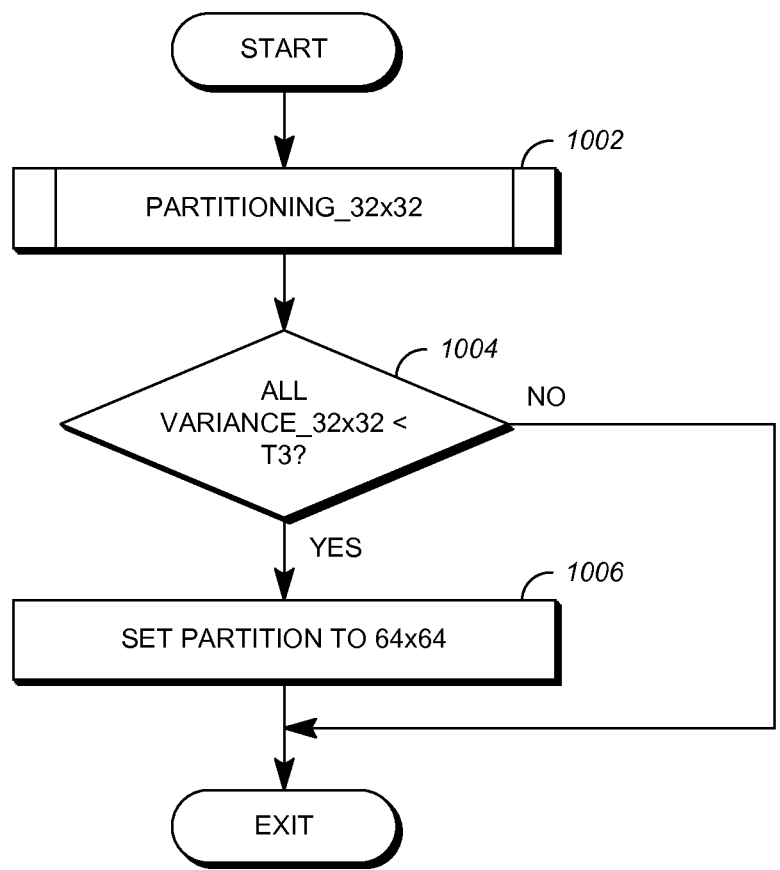
FIG. 10 is a flowchart diagram of a process for partitioning blocks of a video frame according to another aspect of the teachings herein.

The source difference variance based partitioning of step 706 is next described with respect to FIGS. 8, 9 and 10. Each is a flowchart diagram of a respective process 800, 900, 1000 for partitioning blocks of a video frame according to aspects of the teachings herein. These figures collectively provide an example of processing a basic encoding unit of 64 pixels×64 pixels, herein referred to as a superblock, using source difference variance based partitioning. In this example, processes 800, 900 and 1000 are nested loops whereby process 800 is called at step 906 of process 900, and process 900 is called at step 1002 of process 1000 to partition a frame. This is not required, however. Process 800 may occur before the start of process 900, and process 900 may occur before the start of process 1000, with the results stored and updated for each subsequent process before encoding an entire frame. Accordingly, references to first, second and third partitioned blocks and first, second and third partition sizes are intended to distinguish one reference from the others for clarity and are not intended to refer to any sequence in processing or to any particular size value. Moreover, not all of processes 800, 900 and 1000 may need to be performed, or one or more of processes 800, 900 and 1000 may need to be repeated, when using a different basic encoding unit or a smaller minimum partition size as discussed in more detail below.

Referring first to FIG. 8, process 800 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 800. Process 800 can also be implemented using hardware in whole or in part. As explained above, some computing devices may have multiple memories and multiple processors, and the steps of process 800 may in such cases be distributed using different processors and memories.

At step 802, process 800 partitions blocks of the current frame (e.g., from step 706 of FIG. 7) into a first partition size and initializes an index (or count) for the first partitioned blocks. The first partition size may be a size larger than the minimum partition size for a block. In this example, the minimum partition size is 8×8 pixels, so the partition size is 16×16 pixels. Further, since process 800 is a step within process 900 in this example, it partitions only a single 32×32-pixel block and is repeated each time called within process 900. Variations are possible. For example, if there were only two partition sizes, only process 800 would be used with a first partition size equal to the largest partition (i.e., the size of the basic encoding unit). During this process, and the subsequent encoding of the current frame, the last source (i.e., unencoded frame) needs to be available. Accordingly, it is desirable to create, in or in communication with the encoder, a 2-frame circular buffer to store the last source frame and the current source frame. The current frame, when read in the buffer, would overwrite the frame before the last frame instead of the last frame. This makes the last (or previous) source frame available during encoding of the current frame.

At step 804, the index value index_16×16 is queried to see if all four first partitioned blocks have been tested. If index_16×16 is four or more, process 800 exits or ends because all blocks of the first partition process have been considered. Where process 800 is nested in process 900, control passes back to process 900. Otherwise, process 800 advances to step 806 to determine whether the current partitioned block may be partitioned using a smaller partition size. At step 806, the variance for the current block, variance_16×16, can be calculated using a spatially-correspondent block from a previous video frame. The previous video frame is desirably the temporally adjacent previous frame to the current frame. The variance of a block may be calculated using pixel-by-pixel differences between spatially-correspondent pixels of the two blocks. For example, the variance of an M×M block is calculated $$\frac{SSD}{(M^2)} - \text{Mean}^2,$$

as where SSD is the sum of squared source differences and Mean is the average of the source differences. However, any measure of dispersion applied to the difference between the blocks can be used.

At step 808, the calculated variance_16×16 is compared to a first range. Here, since the variance is always a positive value, the range is represented by a comparison to a threshold T1. If variance_16×16 is less than the first threshold T1, the partition size is set to (maintained at) 16×16 in step 810, otherwise the 16×16 block can be partitioned into four 8×8 blocks. The partition size is set to the smaller partition size at step 812. Regardless of whether the partition size is set at step 810 or step 812, process 800 advances to step 814 to increment index_16×16 to repeat steps 804-812 for the next one of the first partitioned blocks.

Process 900, like process 800, can be implemented as a software program that is executed by a computing device such as transmitting station 112 or receiving station 130. The software program can include machine-readable instructions that are stored in a memory such as memory 226 that, when executed by a processor such as CPU 224, cause the computing device to perform process 900. Process 900 can also be implemented using hardware in whole or in part. The steps of process 900 may be distributed using different processors and memories.

At step 902, process 900 partitions blocks of the current frame (e.g., from step 706 of FIG. 7) into a second partition size that is the next larger available partition size than the first partition size and initializes an index (or count) for the second partitioned blocks. In this example, the second partition size is 32×32 pixels. Since process 900 is a step within process 1000 in this example, it partitions only a single 64×64-pixel block and is repeated each time called within process 1000. Variations are possible. For example, if there were only three partition sizes, only processes 800 and 900 would be used with the second partition size equal to the largest partition (i.e., the size of the basic encoding unit) and the first partition size equal to the next smaller available partition size. For example, if the basic encoding unit were 32×32 pixels, process 900 could be performed for each 32×32-pixel block of the current frame (i.e., not just four at step 904) without performing process 1000. In another example, if the basic encoding unit were 16×16 pixels, and partition sizes of 4×4 pixels and 8×8 pixels were available, process 800 could be performed with a first partition size of 8×8 pixels (and smaller partition size 4×4 pixels at step 812) with an appropriate value to check the index and process 900 could be performed with a second partition size of 16×16 pixels with an appropriate value to check the index.

At step 904, the value of index_32×32 is queried to see if it is less than four, where the first of the four partitioned 32×32-pixel blocks is identified with index_32×32=0. If not, process 900 ends or exits. In this example, control passes to back to step 1004 of FIG. 10. If the value is less than four, process 900 calls process 800 at step 906. At the end of step 906, process 800 has generated variance values for all 16×16-pixel blocks forming the current partitioned block of 32×32 pixels. At step 908, these values are compared to a second range, here a second threshold T2 due to the positive values for the variances. If any of the variance values are greater than threshold T2, process 900 takes no action for the current partitioned block and advances to step 912 to increment index_32×32 to start process 900 for the next partitioned block. Essentially, this leaves the partition sizes selected in process 800 unchanged for the current block of 32×32 pixels.

In contrast, if all of the 16×16 variance values are less than threshold T2, process 900 advances to step 910. At step 910, the partition size is set to 32×32 for the current block of 32×32 pixels. In other words, the partition size(s) for the blocks that result from process 800 are replaced with a single partition. This may be considered to be combining the smaller partitioned blocks into one larger partition to form a larger static or slow motion area in the video. The second range should be tighter than the first range. In this example, the per-pixel variance reflected by the value of threshold T2 should be lower than that reflected by the value of threshold T1.

If process 900 is not the larger process in the partitioning (i.e., process 900 is not performed for the largest available partition size), the variance value for the current 32×32-pixel block can be determined from the four 16×16 variances of the 16×16 blocks that comprise the 32×32 block, thereby saving calculation time and resources. This value variance_32×32 would be used for the next partitioning process, here process 1000. Following step 910, process 900 advances to step 912 to increment index_32×32 to begin process 900 for the next block, if any. In this example, once all four 32×32-pixel blocks of a 64×64-pixel superblock have been processed, process 900 ends by exiting to step 1004 of process 1000.

Process 1000, like processes 800 and 900, can be implemented as a software program that is executed by a computing device such as transmitting station 112 or receiving station 130. The software program can include machine-readable instructions that are stored in a memory such as memory 226 that, when executed by a processor such as CPU 224, cause the computing device to perform process 1000. Process 1000 can also be implemented using hardware in whole or in part. The steps of process 1000 may be distributed using different processors and memories.

Process 1000 is run for each superblock of the current frame to make the final determination as to what partition size(s) to use for the superblock. Although not shown as such for simplicity, process 1000 could thus be considered to include a step of partitioning blocks of the current frame (e.g., from step 706 of FIG. 7) into a third partition size that is the largest available partition size (i.e., the size of the basic encoding unit).

At step 1002, process 1000 calls process 900 (FIG. 9) to determine the partitioning of the four 32×32-pixel blocks of the superblock. Following the return of process 900 to step 1004, process 1000 compares the variance values for the 32×32-pixel blocks to a third range, here a threshold T3. If variance_32×32 for each 32×32-pixel block of the current superblock is less than threshold T3, process 1000 selects a partition size of 64×64 for the current superblock at step 1006. In other words, the 32×32-pixels blocks are combined into a 64×64 superblock. Otherwise, process 1000 exits without changing the one or more partitions sizes (in this example, 8×8, 8×8 and 16×16, 16×16, 16×16 and 32×32, or 32×32) selected for the 32×32-pixel blocks by the completion of process 900.

Desirably, the third range is tighter than the second range. That is, the per-pixel variance reflected by the value of threshold T3 should be lower than that reflected by the value of threshold T2, which is still lower than that reflected by the value of threshold T1. The selection of thresholds may depend on the noise level in the source video. Smaller ranges and thresholds would be desirable for video streams with a relatively low noise level, with larges ranges or thresholds assigned to video streams with more noise. In one implementation, T1=10000, T2=360 and T3=720.

The teachings above describe a partitioning process that eliminates the common extensive partitioning search method that is very time-consuming and processing-intensive and not generally suitable for video conferencing and live streaming. The process provides reduced encoding time over such techniques while providing a more efficient result than fixed partitioning alone.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
    periodically sampling a plurality of frames of a video stream to obtain a current frame for partitioning at a frame interval;
    performing source difference variance based partitioning of the current frame, the source difference variance based partitioning including, for each block of a plurality of blocks of the current frame:
        partitioning the block into a plurality of first partitioned blocks having a first partition size, the block having a size at least as large at the first partition size and the first partition size corresponding to one of at least two available partition sizes;
        for each first partitioned block having the first partition size:
            calculating a variance value based on differences between pixels of the first partitioned block and pixels of a spatially correspondent block in a previous frame;
            if the variance value for the first partitioned block is within a first defined range, selecting the first partition size for the pixels of the first partitioned block; and
            if the variance value for the first partitioned block is outside the first defined range, selecting a smaller partition size than the first partition size for the pixels of the first partitioned block;
        partitioning the current frame according to one or more selected partition sizes for each of the plurality of blocks to form a partitioned current frame; and
        encoding the partitioned current frame for inclusion in a bitstream.

2. The method of claim 1 wherein the frame interval is greater than one, the method further comprising, for each intervening frame of the plurality of frames between the frame interval:
    comparing a number of the blocks of a previously-partitioned frame of the plurality of frames having a minimum partition size to a threshold value, the previously-partitioned frame partitioned using the source difference variance based partitioning;
    if the number is below the threshold, selecting a fixed partitioning size for pixels of the intervening frame;
    if the number is at or above the threshold, performing the source difference variance based partitioning of the intervening frame as the current frame to select at least one partition size for the pixels of the intervening frame;
    partitioning the pixels of the intervening frame according to one or more selected partition sizes to form a partitioned intervening frame; and
    encoding the partitioned intervening frame.

3. The method of claim 2 wherein the number is a percentage of a total number of blocks of the previously-partitioned frame having the minimum partition size.

4. The method of claim 3 wherein the percentage is 15%.

5. The method of claim 1 wherein performing the source difference variance based partitioning further includes, for each block of the plurality of blocks of the current frame:
    partitioning the block into at least one second partitioned block having a second partition size, the block having a size at least as large at the second partition size and each second partitioned block encompassing at least two adjacent first partitioned blocks of the plurality of first partitioned blocks;
    for each second partitioned block having the second partition size:
        if each variance value for the at least two adjacent first partitioned blocks encompassed within the second partitioned block is within a second defined range, selecting the second partition size for pixels of the second partitioned block; and
        if at least one variance value for the at least two adjacent first partitioned blocks encompassed within the second partitioned block is outside the second defined range, selecting one or more partition sizes for pixels of the at least two adjacent first partition blocks encompassed within the second partitioned block for the pixels of the second partitioned block, wherein the second defined range defines a lower average per-pixel variance than the first defined range.

6. The method of claim 5 wherein the at least one second partitioned block comprises a plurality of second partitioned blocks, and wherein performing the source difference variance based partitioning further includes, for each block of the plurality of blocks of the current frame:
    partitioning the block into a plurality of third partitioned blocks having a third partition size, the block having a size at least as large at the third partition size and each third partitioned block encompassing at least two adjacent second partitioned blocks of the plurality of second partitioned blocks;
    for each third partitioned block having the third partition size:
        if each variance value for the at least two adjacent second partitioned blocks encompassed within the third partitioned block is within a third defined range, selecting the third partition size for pixels of the third partitioned block; and
        if at least one variance value for the at least two adjacent second partitioned blocks encompassed within the third partitioned block is outside the third defined range, selecting one or more partition sizes for pixels of the at least two adjacent second partition blocks encompassed within the third partitioned block for the pixels of the third partitioned block, wherein the third defined range defines a lower average per-pixel variance than the second defined range.

7. The method of claim 6 wherein each block of the plurality of blocks comprises 64 pixels×64 pixels, the first partition size is 16 pixels×16 pixels, the second partition size is 32×32 pixels, the third partition size is 64 pixels×64 pixels, and the smaller partition size is 8 pixels×8 pixels.

8. The method of claim 6 wherein the first defined range, the second defined range and the third defined range depend on a noise level of the video stream.

9. The method of claim 8 wherein the first defined range is 0 to 10000, inclusive, the second defined range is 0 to 360, inclusive, and the third defined range is 0 to 720, inclusive.

10. The method of claim 6 wherein calculating a variance value between the pixels of the second partitioned block and pixels of a spatially correspondent block in the previous frame comprises combining each variance value for the at least two adjacent first partitioned blocks encompassed within the second partitioned block into a single variance value.

11. An apparatus, comprising:
a memory; and
a processor configured to execute instructions stored in the memory to:
    periodically sample a plurality of frames of a video stream to obtain a current frame for partitioning at a frame interval;
    perform source difference variance based partitioning of the current frame, the source difference variance based partitioning including, for each block of a plurality of blocks of the current frame:
    partitioning the block into a plurality of first partitioned blocks having a first partition size, the block having a size at least as large at the first partition size and the first partition size corresponding to one of at least two available partition sizes;
        for each first partitioned block having the first partition size:
        calculating a variance value based on differences between pixels of the first partitioned block and pixels of a spatially correspondent block in a previous frame;
        if the variance value for the first partitioned block is within a first defined range, selecting the first partition size for the pixels of the first partitioned block; and
        if the variance value for the first partitioned block is outside the first defined range, selecting a smaller partition size than the first partition size for the pixels of the first partitioned block;
    partition the current frame according to one or more selected partition sizes for each of the plurality of blocks to form a partitioned current frame; and
    encode the partitioned current frame for inclusion in a bitstream.

12. The apparatus of claim 11 wherein the processor is configured to perform the source difference variance based partitioning by, for each block of the plurality of blocks of the current frame:
    partitioning the block into at least one second partitioned block having a second partition size, the block having a size at least as large at the second partition size and each second partitioned block encompassing at least two adjacent first partitioned blocks of the plurality of first partitioned blocks;
    for each second partitioned block having the second partition size:
    if each variance value for the at least two adjacent first partitioned blocks encompassed within the second partitioned block is within a second defined range, selecting the second partition size for the pixels of the second partitioned block; and
    if at least one variance value for the at least two adjacent first partitioned blocks encompassed within the second partitioned block is outside the second defined range, selecting one or more partition sizes for pixels of the at least two adjacent first partition blocks encompassed within the second partitioned block for the pixels of the second partitioned block, wherein the second defined range defines a lower average per-pixel variance than the first defined range.

13. The apparatus of claim 12 wherein the first partition size is 16 pixels×16 pixels, the second partition size is 32×32 pixels, and the smaller partition size is 8 pixels×8 pixels.

14. The apparatus of claim 12 wherein the frame interval is greater than one and the processor is configured to, for each intervening frame of the plurality of frames between the frame interval:
    compare a number of the blocks of a previously-partitioned frame of the plurality of frames having a minimum partition size to a threshold value, the previously-partitioned frame partitioned using the source difference variance based partitioning;
    if the number is below the threshold, select a fixed partitioning size for pixels of the intervening frame;
    if the number is at or above the threshold, perform the source difference variance based partitioning of the intervening frame as the current frame to select at least one partition size for the pixels of the intervening frame;
    partition the pixels of the intervening frame according to one or more selected partition sizes to form a partitioned intervening frame; and
    encode the partitioned intervening frame.

15. The apparatus of claim 14 wherein the number is a percentage of a total number of blocks of the previously-partitioned frame having the minimum partition size.

16. The apparatus of claim 14 wherein the at least one second partitioned block comprises a plurality of second partitioned blocks, and the processor is configured to configured to perform the source difference variance based partitioning by, for each block of the plurality of blocks of the current frame:
    partitioning the block into a plurality of third partitioned blocks having a third partition size, the block having a size at least as large at the third partition size and each third partitioned block encompassing at least two adjacent second partitioned blocks of the plurality of second partitioned blocks;
    for each third partitioned block having the third partition size:
    if each variance value for the at least two adjacent second partitioned blocks encompassed within the third partitioned block is within a third defined range, selecting the third partition size for pixels of the third partitioned block; and
    if at least one variance value for the at least two adjacent second partitioned blocks encompassed within the third partitioned block is outside the third defined range, selecting one or more partition sizes for pixels of the at least two adjacent second partition blocks encompassed within the third partitioned block for the pixels of the third partitioned block, wherein the third defined range defines a lower average per-pixel variance than the second defined range.

17. The apparatus of claim 16 wherein the first partition size is 16 pixels×16 pixels, the second partition size is 32×32 pixels, the third partition size is 64 pixels×64 pixels, and the smaller partition size is 8 pixels×8 pixels.

18. The apparatus of claim 1 wherein the previous frame is an unencoded video frame immediately preceding the current frame in a sequence of the plurality of frames of the video stream.

19. The apparatus of claim 11 wherein the processor is configured to calculate the variance value using source differences between the pixels of the first partitioned block and the pixels of the spatially correspondent block in the previous frame.

20. The apparatus of claim 11, further comprising:
a two-frame circular buffer storing each of the current frame and the previous frame in an unencoded state.

* * * * *